United States Patent

Dean et al.

[11] Patent Number: 5,841,621
[45] Date of Patent: Nov. 24, 1998

[54] SENSORLESS MEASUREMENT OF ELECTROMAGNETIC ACTUATOR DISPLACEMENT DEVICE

[75] Inventors: Arthur L. Dean, Indiana, Pa.; Michael Steven Giusto, Cupertino, Calif.

[73] Assignee: FMC Corporation, Chicago, Ill.

[21] Appl. No.: 659,066

[22] Filed: Jun. 4, 1996

Related U.S. Application Data

[63] Continuation of Ser. No. 214,479, Mar. 17, 1994, abandoned.

[51] Int. Cl.$^6$ .................................................. G08B 21/00
[52] U.S. Cl. ..................... 361/185; 361/143; 324/207.11; 340/683
[58] Field of Search ..................... 361/185, 143, 361/153, 154, 139; 324/207.11, 76.77, 76.79; 340/683, 658, 644

[56] References Cited

U.S. PATENT DOCUMENTS

| | | | |
|---|---|---|---|
| 4,074,185 | 2/1978 | Dardenne | 324/208 |
| 4,659,969 | 4/1987 | Stupak, Jr. | 361/154 X |
| 4,851,959 | 7/1989 | Stumpf | 361/160 X |
| 4,950,985 | 8/1990 | Voss et al. | 361/170 X |
| 4,970,622 | 11/1990 | Büchl | 361/154 |
| 5,172,298 | 12/1992 | Shimizu et al. | 361/152 |
| 5,196,983 | 3/1993 | Stumpf | 361/160 X |
| 5,206,540 | 4/1993 | de Sae Silva et al. | 361/153 X |
| 5,293,551 | 3/1994 | Perkins et al. | 361/154 |
| 5,539,608 | 7/1996 | Hurley et al. | 361/154 |
| 5,602,711 | 2/1997 | Curtis et al. | 361/139 |

FOREIGN PATENT DOCUMENTS

| | | | |
|---|---|---|---|
| 549911A | 7/1993 | European Pat. Off. | G01R 27/26 |
| 2602047A | 1/1988 | France | G01D 5/20 |
| 2044461 | 10/1980 | United Kingdom | G01B 7/30 |
| 2213594 | 8/1989 | United Kingdom | G01B 7/00 |
| 9311369A | 6/1993 | WIPO | G01D 5/20 |

*Primary Examiner*—Fritz Fleming
*Attorney, Agent, or Firm*—Ronald C. Kamp

[57] ABSTRACT

This invention pertains to sensorless measurement of electromagnetically induced displacement in actuators and similar units. Primarily, the device imposes a constant frequency and amplitude excitation sine wave on a coil through a fixed impedance of a drive isolation network. The amplitude and phase of the voltage across the coil fluctuate depending upon the coil's inductance. This variation in the value of the inductance is dependent upon the change in magnetic flux density generated by the coil current and the displacement in air gap between the coil pole and armature. Accordingly, a measurable magnitude of displacement can be controllably imposed upon a system of solenoids. The displacement is thus measured and set without the use of extrinsic sensors.

8 Claims, 2 Drawing Sheets

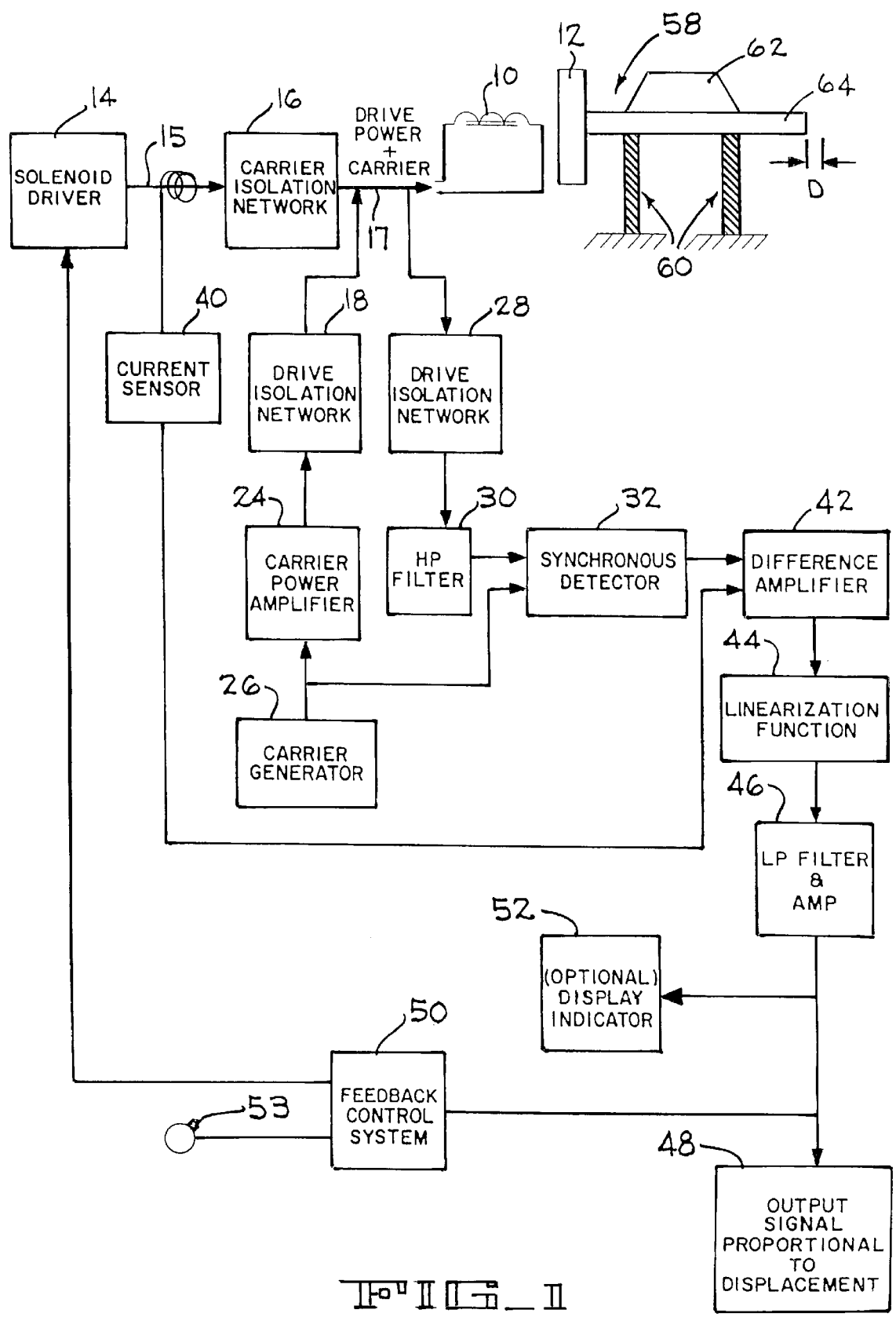
FIG_1

FIG_2A
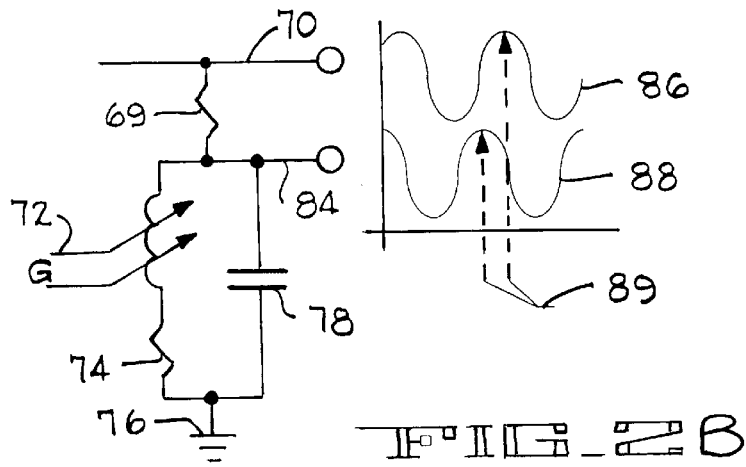
FIG_2B
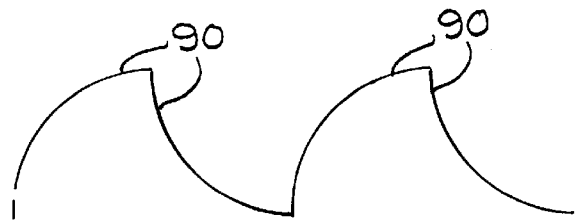
FIG_3
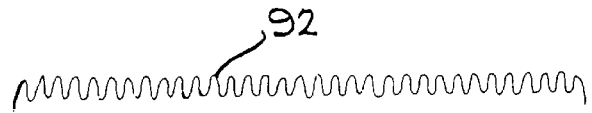
FIG_4
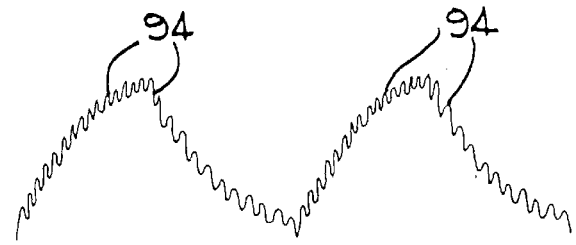
FIG_5

SENSORLESS MEASUREMENT OF ELECTROMAGNETIC ACTUATOR DISPLACEMENT DEVICE

This application is a continuation of application Ser. No. 08/214,479 filed Mar. 17, 1994, now abandoned, which is hereby replaced by the Application submitted herein.

FIELD OF THE INVENTION

This invention relates to a method and device to sense and control the displacement of electromagnetic actuators without the use of discrete sensors. The invention enables a centralized monitoring and control of a multitude of actuators by utilizing a control loop to yield constant displacement under varying load conditions. In the alternate, the invention may be used to indicate displacement, without the use of a closed loop control, in which case a manual adjustment is effectuated.

SUMMARY OF THE INVENTION

The sensorless measurement of electromagnetic actuator displacement method and device of the present invention imposes a constant frequency and amplitude excitation sine wave on a solenoid coil through a fixed impedance of a drive isolation network. Compared to the excitation signal, the amplitude and phase of the voltage across the solenoid fluctuate relative to variations in the coil's inductance. The variation or change in inductance is dependent upon the change in magnetic flux density, generated by the solenoid coil current, and the dynamic change (displacement) in air gap between the coil pole face and armature. A signal can be derived that is a function of the displacement by taking into account the effects of the magnetizing force and current. The effects of the magnetizing force can be accounted for either by sensing the coil current or by taking the displacement readings only when the magnetizing force is zero. After the coil current is sensed, the information is combined with the derived signal to generate a signal that is proportional to the displacement only. In the alternate, displacement can be recorded when the magnetizing current is zero, thus eliminating its effect on the derived signal.

Specific advances, features and advantages of the present invention will become apparent upon examination of the following description and drawings dealing with specific embodiments thereof.

BRIEF DESCRIPTION OF THE DRAWINGS

FIG. 1 is a block diagram showing interactive and operational sequence of the device.

FIG. 2A is an exemplary circuit. FIG. 2B depicts a phase shift when a carrier signal is supplied to a solenoid through a drive isolation network.

FIG. 3 illustrates a typical wave form which is a portion of a cycle of a fixed amplitude power line sine wave.

FIG. 4 is an exemplary fixed frequency sine wave.

FIG. 5 is a typical wave form. It is a resultant of a carrier signal superimposed on the drive power.

DESCRIPTION OF THE PREFERRED EMBODIMENT

The present invention relates to a device and method which imparts a constant frequency and voltage amplitude excitation sine wave (carrier) to a solenoid coil through a fixed impedance of a drive isolation network. The amplitude and phase of the voltage across the solenoid (output), relative to the excitation signal (input), change in relation to the coil's inductance. Accordingly, a desired magnitude of displacement can be controllably imposed upon a system of solenoids.

Generally, the present invention eliminates several problems encountered in material handling equipment, inter alia, such as vibratory finishers and feeders, conveyors and actuators by enabling the measurement and control of displacement in electromagnetic actuators. One of the critical design and performance parameters in these systems is the control of displacement. Once displacement is made controllable a centralized monitoring circuit can be easily implemented.

One of the many problems addressed by the present invention includes keeping constant product flow under varying load conditions by adjusting the displacement to be compatible with the load. Further, the present invention enables maintaining, for example, a vibratory feeder, at its natural resonant frequency to promote maximum system efficiency. Furthermore, the problem of greater power consumption than necessary because of the need to operate the vibrator off its natural resonant frequency as well as the problem of higher material and production costs because the vibrator needs to be larger when it is not being operated at maximum efficiency are eliminated. Displacement signal may be generated to influence downstream process systems which are sensitive to volumetric changes, for example. Flavorings and similar expensive as well as volumetrically critical additives in process systems could thus be monitored closely by the displacement measurement device of the present invention.

Referring now to FIG. 1, electromagnetic solenoid 10 is disposed opposite armature 12. Solenoid driver 14 provides drive power 15 to electromagnetic solenoid 10. Carrier isolation network 16 insures that the parameters of the carrier signal, i.e. amplitude and phase, are only affected by the varying inductance of electromagnetic solenoid 10. Carrier isolation network 16 could be, for example, a network of passive components forming a parallel resonant circuit wherein the resonance frequency would be set to the carrier frequency. Power connection to solenoid 10 is implemented via drive power and carrier line 17. Drive isolation network 18 is connected through line 17. Further, drive isolation network 18 is a network of passive components forming a voltage divider with or without a clamping diode. Drive isolation network 18 is coupled to carrier power amplifier 24. Carrier generator 26 supplies a carrier signal to solenoid 10 and is connected via carrier power amplifier 24 and drive isolation network 18. Drive isolation network 28 is coupled to solenoid 10. High pass filter 30 is coupled to drive isolation network 28 and synchronous detector 32. Carrier generator 26 is also connected to synchronous detector 32. Further, current sensor 40 is coupled to drive power 15 and difference amplifier 42. Difference amplifier 42 is coupled to linearization function 44 which is also connected to low pass filter and amplifier 46. Furthermore, low pass filter and amplifier 46 is connected to output 48 and feedback control system 50. The control loop is completed by connecting feed back control system 50 to solenoid driver 14. A displacement gauge 53 may be coupled to feedback control system 50 to adjust/dial in displacement as apparent. As will be discussed hereinbelow, displacement gauge 53 and associated controls can be used to effectuate a desired acceleration or deceleration of a process systems needed. Armature 12 is integrally attached to a load bearing structure 58, such as a feeder or a conveyor, with support springs 60.

Load 62 is supported on platform 64 and mechanical displacement for the structure is designated by "D".

Referring now to FIG. 2A, a conceptual depiction of a circuit is shown wherein a carrier signal is supplied to a solenoid through a drive isolation network. The figure provides a modular and yet simplified version of some of the significant aspects inherent in the present invention. Drive isolation Network impedance 69 is connected to carrier input 70 in a circuit comprising coil 72, having coil air gaps "G"; resistor 74; ground 76; and coil capacitor 78 forming a circuit therein with an output terminal 84. FIG. 2B indicates readings taken between input terminals 70 and output terminal 84. The curves indicates carrier input wave form 86 and modulated carrier output 88 with wave shift 89 as indicated.

Turning now to FIG. 3, a typical wave form is shown. Ascending and descending wave fronts 90 are portions of a fixed amplitude power line waves.

FIG. 4 shows a fixed frequency sine wave 92. This wave is similar to a carrier signal transmitted to solenoid 10.

FIG. 5 is a typical wave form having rising and descending wave fronts 94. This is a combination of wave fronts from a carrier signal and a power source.

The disclosure hereinabove relates to some of the most important structural features and operational parameters for the sensorless measurement electromagnetic actuator displacement device.

Referring now to FIG. 1, Solenoid driver 14 supplies driving power to the electromagnetic solenoid 10. It is normally a phased controlled triac or SCR that is operated directly from the power line. The driver may be of type model CC2 controller manufactured by FMC-MHED in Homer City, Pa. The drive power comprises a series of pulses or waves where the leading and trailing edges are rounded off because of the highly reactive nature of solenoid 10. For example, FIG. 3 illustrates a typical wave of a portion of a cycle for a fixed amplitude 50 or 60 hertz power line sine wave. If a vibratory feeder such as load bearing structure 58 is to be operated at its natural frequency, a closed loop system comprising feedback control system 50 with a variable frequency solenoid driver 14 will be needed to control the displacement. Displacement control is one of the advances proffered by the present invention. Further, the advances made by the present invention in displacement control enable the sensing, controlling and monitoring of process equipment to operate at a desired frequency within a desired acceleration and deceleration profile. This feature increases process equipment throughput and efficiency by eliminating manual intervention and guess work. The interaction of feedback control system 50 and solenoid driver 14 will be discussed hereinbelow.

Accordingly, the frequency will be set at the vibratory feeder's (system's) natural resonance frequency which changes with the feeder's loading. It is noteworthy that the natural resonance frequency is dependent upon the type and physical properties such as density and viscosity for example, of the material as well as the feeder's structural organization and components. Thus, the ability to adjust the displacement to any required natural resonance frequency for a variable load and material condition, is one of the significant elements of the present invention. Particularly, by controlling the displacement, acceleration, deceleration and braking of a process system can be effectuated. Further, the present invention provides constant amplitude with varying load conditions and constant amplitude with different trough or structural designs in process equipment. Referring back to FIG. 1 now, drive power is coupled to solenoid 10 via carrier isolation network 16 to insure that the parameters of the carrier signal, which comprise amplitude and phase are affected only by the varying inductance of the coil of solenoid 10. The electromagnetic solenoid 10 and armature 12 may be, for example, a model FTφ1 feeder, manufactured by FMC-MHED, Homer City, Pa. Without carrier isolation network 16, the carrier excitation signal would change dramatically as the solenoid drive is turned on and off. Carrier isolation network 16 can be a network of passive components forming a parallel resonant frequency. Thus, the resonance frequency would be set to the carrier frequency using carrier isolation network 16 by selecting the appropriate current. Carrier generator 26 supplies a carrier signal to solenoid 10 in the form of a fixed frequency sine wave as shown in FIG. 4. This is a smaller amplitude and much higher frequency signal compared to the drive signal. Accordingly, drive and carrier signals can easily be separated by isolation networks and filters. Subsequently, carrier power amplifier 24 amplifies the signal generated by carrier generator 26 to a level sufficient to obtain an adequate signal-to-noise ratio at synchronous detector 32. Carrier power is then coupled to solenoid 10 by drive isolation network 18. This insures that the drive signal is not coupled back into carrier power amplifier 24 and prevents damages which are otherwise likely to occur.

Drive isolation network 18 is a network of passive components forming a voltage divider with or without a clamping diode. In the alternate, a network of passive components forming a parallel resonant circuit could be used as a substitute. The resonant frequency is set at or near the frequency of solenoid driver 14. Synchronous detector 32 eliminates the carrier signal from the solenoid driver power. The output of synchronous detector 32 is proportional to the phase difference between the carrier signal and the signal developed across solenoid 10. The resultant phase difference is a function of solenoid magnetizing current or magnetic flux density and provides a voltage output at synchronous detector 32. Difference amplifier 42 subtracts out the effects of the solenoid magnetizing current from the output of synchronous detector 32 to produce an output that is proportional to displacement only. Current sensor 40 senses the solenoid magnetizing current generated by the coil of solenoid 10. The relationship between solenoid coil current and the magnetic flux density is non-linear. Corrections are made to the output of difference amplifier 42 and linearization function 44 is used to effectuate the correction. Linearization function 44 may be in the form of, inter alia, a non-linear function generator, a microprocessor base look-up table or a microprocessor base model of solenoid 10. In the alternate, current sensor 40 may be used as a level sensor and difference amplifier 42 can be operated when the drive current is below a level that would cause an error in the displacement measurement. To integrate this alternate option, difference amplifier 42 incorporates a sample-and-hold circuit to maintain the output of difference amplifier 42 constant when the drive current is above an acceptable level.

Drive isolation network 28 prevents the drive power from solenoid driver 14 against overloading high pass filter 30. Drive isolation network 28 has the same topology as drive isolation network 18. High pass filter 30 is used to further improve signal-to-noise ratio at synchronous detector 32 by reducing the amplitude of the signal of solenoid driver 14 signal which is resident at the input of synchronous detector 32. Low pass filter 46 provides a signal that is proportional to displacement. The signal output from low pass filter 46 is one of the many significant parameters which could be tailored to match with a given system operation. For example, when used in vibrating feeders, the signal is the controlled displacement output, with feedback control system 50 providing the controlling features. Without feedback control system 50, the system is open loop and display indicator 52 is needed to show the displacement.

Referring now to FIG. 1, when solenoid 10 is energized, armature 12 is displaced. Ultimately load bearing structure 58 and support springs 60 are swayed laterally resulting in platform 64 being displaced a distance "D" as indicated. Feedback control system 50 enables monitoring and control of displacement "D" so that load bearing structure 58 and bulk product 62, which comprise a system, could be operated at a natural frequency. Thus, the frequency will be set at the system's natural resonance frequency which changes with feeder loading. Further, a desired displacement may be initiated by dialing in the magnitude at displacement gauge 53 to set variable frequency solenoid driver 14 at the desired resonance frequency such that displacement "D" is adjustably set as needed. As discussed hereinabove, displacement gauge 53 may also be used to set a desired deceleration and acceleration profile. Further, Power applied in opposite phase to the displacement of the process equipment acceleration may be used to brake, instantly, the equipment thus arresting the displacement to zero through active damping.

Accordingly the present invention comprises two major components, namely, electromagnetic drive unit with trough or pan and electronic controller with associated control panels. As depicted in FIG. 2, one of the many important aspects of the present invention is the application of a constant frequency and amplitude excitation sine wave (carrier) to a solenoid coil through the fixed impedance of a drive isolation network. In sharp contrast, the current state of the art is to use a single-phase direct-attraction-type AC magnet to induce vibratory motion in electromagnetic vibrators. The magnet has usually a flat-faced armature which is held in position by support springs. Upon application of drive power, the armature is displaced. Generally, in this type of system the solenoid is attached to a trough, pan or bowl and uses the vibratory motion set up by the armature to convey or feed material. Such electromagnetic vibrators are normally driven by an open loop phase controlled SCR or triac and require intensive manual intervention to operate. This makes the current state of the art labor intensive and inefficient.

The present invention utilizes a closed loop control system to yield a constant displacement under varying load conditions. As discussed hereinabove, a more uniform product flow and increased efficiency is achieved by eliminating manual operation and automatically operating the system at near the natural resonant frequency of the system. It should be noted that displacement is controlled by drive amplitude irrespective of system frequency. However, a secondary control loop, such as feedback control system 50 configured with low pass filter 46, can be used to maintain the system at its natural resonant frequency. Further, the present invention enables an optional controller feature to be placed under the governance of a host computer that would make the necessary changes in material flow to be congruent with a predetermined displacement magnitude and frequency. This feature provides significant flexibility in operation and promotes system efficiency.

While a preferred embodiment of the sensorless measurement of electromagnetic actuator displacement device has been shown and described, it will be appreciated that various changes and modifications may be made therein without departing from the spirit of the invention as defined by the scope of the appended claims.

What is claimed is:

1. A device incorporated with a load bearing vibratory structure for managing vibratory motion and measuring, adjusting and controlling electromagnetically induced vibratory displacement in the load bearing vibratory structure wherein the vibratory displacement is created by imposing a constant frequency and amplitude excitation wave on a solenoid coil through a fixed impedance of a drive isolation network, the device comprising:

a carrier generator to generate a carrier signal at a predetermined frequency to provide the constant frequency and amplitude excitation wave;

an electromagnetic solenoid coil;

an armature disposed apposite said solenoid;

a drive to provide power to said solenoid;

carrier isolation network including a network of passive components forming a parallel resonant frequency to isolate inductance of said solenoid coil wherein said resonant frequency is equal to said carrier signal at said predetermined frequency; and said armature integrally attached to said load bearing vibratory structure, said carrier generator, said electromagnetic solenoid, said armature, said drive, said carrier isolation network and said drive isolation network being in one of operative electrical and electromagnetic communication to enable said measurement of the vibratory displacement of the load bearing vibratory structure to thereby control acceleration, deceleration and braking of the load bearing vibratory structure.

2. The device according to claim 1 wherein said drive isolation network is coupled to said solenoid coil and includes an impedance connected to a carrier input and further includes a network of passive components forming a voltage divider.

3. A device for controlling and adjusting vibratory displacement of a load bearing vibratory structure under varying load conditions such that the varying load and the vibratory structure could be operated at natural frequency wherein a carrier signal is supplied to a solenoid coil through a fixed impedance of a drive isolation network, the device comprising:

means for driving said solenoid coil;

carrier isolation network including a network of passive components forming a parallel resonant frequency to isolate inductance of said solenoid coil wherein said resonant frequency is equal to the carrier signal at said predetermined frequency;

the drive isolation network being coupled to said solenoid coil;

an armature spaced apart from said solenoid coil; and the load bearing vibratory structure being attached to said armature, said means for driving, said isolation network and said armature being in one of operative electrical and electromagnetic communication to sense current in said solenoid coil and measure and adjust said vibratory displacement of the load bearing vibratory structure.

4. The device according to claim 3 wherein said carrier signal is a constant sinusoidal wave and is combined with a derived signal after said current is sensed in the solenoid coil.

5. A method for measuring, controlling and adjusting electromagnetically induced vibratory displacement in a load bearing vibratory structure having variable loading conditions using a device for imposing a constant frequency and amplitude excitation wave on a solenoid coil through a fixed impedance of a drive isolation network, the device-implemented steps comprising:

provingding a fixed impedance of a drive isolation network;

imposing the constant frequency and amplitude excitation signal in the solenoid coil;

comparing said excitation signal with amplitude and phase of a voltage across said solenoid coil relative to variations in the coil's inductance;

recording changes in inductance which is dependent upon the change in magnetic flux density and displacement change in air gap between a poleface of the coil and an armature;

deriving a signal which is a function of said displacement by considering effects of magnetizing force and current;

sensing the coil current signal;

combining said derived signal with said coil current signal to take out said current signal and to generate a signal proportional to said displacement only; and setting the vibratory displacement to operate said load bearing vibratory structure at a desired frequency within a desired acceleration and deceleration profile.

6. The method according to claim 5 further comprising the step of keeping constant product flow under varying load conditions by adjusting the vibratory displacement to be compatible with a natural resonance frequency of said load bearing vibratory structure and said variable loading conditions.

7. The method according to claim 5 wherein said step of setting the vibratory displacement includes dialing in a displacement gauge which is coupled to a feedback control system to set a variable frequency solenoid driver in order to arrive at said desired frequency within a desired acceleration and deceleration profile.

8. The method according to claim 5 wherein said step of setting the vibratory displacement further includes a damping step wherein power is applied in opposite phase of the vibratory displacement of said load bearing vibratory structure to brake and arrest the vibratory displacement of said load bearing vibratory structure.

* * * * *